United States Patent [19]

Shriver

[11] Patent Number: 5,546,583
[45] Date of Patent: Aug. 13, 1996

[54] METHOD AND SYSTEM FOR PROVIDING A CLIENT/SERVER INTERFACE IN A PROGRAMMING LANGUAGE

[75] Inventor: David I. Shriver, Euless, Tex.

[73] Assignee: International Business Machines Corporation, Armonk, N.Y.

[21] Appl. No.: 223,276

[22] Filed: Apr. 5, 1994

[51] Int. Cl.$^6$ ............................................. G06F 13/00
[52] U.S. Cl. ................................. 395/650; 364/DIG. 1; 364/284.4
[58] Field of Search ............................................. 395/650

[56] References Cited

U.S. PATENT DOCUMENTS

| | | | |
|---|---|---|---|
| 5,086,504 | 2/1992 | Nemeth-Johannes et al. | 395/700 |
| 5,255,386 | 10/1993 | Prager | 395/600 |
| 5,257,366 | 10/1993 | Adair et al. | 395/600 |
| 5,287,514 | 2/1994 | Gram | 395/700 |
| 5,291,585 | 3/1994 | Sato et al. | 395/500 |
| 5,317,722 | 5/1994 | Evans | 395/500 |
| 5,430,876 | 7/1995 | Schreiber et al. | 395/650 |

OTHER PUBLICATIONS

Shriver, David I., "REXX in the CICS Environment", Third REXX Symposium Annapolis, Maryland, 1992, pp. 1–41.
Shriver, David I., "Research on REXX in the CICS Environment", Share 80 San Francisco I916, 1993, pp. 1–44.
Shriver, David I., "Research on REXX in the CICS Environment", Share 77 Chicago, Illinois 1940, 1991, pp. 1–36.

*Primary Examiner*—Thomas M. Heckler
*Attorney, Agent, or Firm*—David A. Mims, Jr.; L. Bruce Terry; Andrew J. Dillon

[57] ABSTRACT

In a data processing system, a programming language processor capable of executing program code is provided. A client program and a server program are also provided within said data processing system. The client program and the server program are comprised of program code capable of execution within said data processing system. Once the client and server programs are invoked, the client program sends a request for a service to the server program. In response to program code within the server program, a request is sent to the client program for a service that requires access to a variable within the client program. The client program then processes the request from the server program and sends the server program a response. Thereafter, the server program continues processing the request from the client program in response to gaining access to the variable in the client program. If the server program has not been initialized when the client program requests a service, the client program automatically initializes the server program.

8 Claims, 6 Drawing Sheets

| CLIENT | SERVER |
|---|---|
| ⋮ | ISSUE 'WAITREQ' COMMAND AND WAIT FOR A REQUEST  50 |
| 52  LANGUAGE PROCESSOR ENCOUNTERS COMMAND TARGETED TO SERVER | |
| 90  LANGUAGE PROCESSOR INITIALIZES SERVER IF NOT ALREADY INITIALIZED | |
| 92  LANGUAGE PROCESSOR PUTS REQUEST IN SERVER 'REQUEST' VARIABLE | WAKE UP AND EXAMINE 'REQUEST' VARIABLE  96 |
| 94  WAIT FOR RESPONSE | UTILIZE SERVER COMMAND "C2S" TO RETRIEVE CLIENT VARIABLE INTO A SERVER VARIABLE BY UTILIZING VARIABLE INTERFACE ROUTINE TO ACCESS CLIENT AND SERVER VARIABLES DIRECTLY  98 |
| | UTILIZE 'S2C' COMMAND TO COPY CONTENTS OF NAMED SERVER VARIABLES TO NAMED CLIENT VARIABLES  100 |
| | COMPLETE REQUEST PROCESSING, SET RETURN CODE, AND LOOP TO ISSUE 'WAITREQ' OR END SERVER  102 |
| | 'WAITREQ' OR SERVER EXIT CODE CAUSES LANGUAGE PROCESSOR TO SET CLIENT RETURN CODE AND WAKES UP CLIENT  104 |
| 106  'RETURN CODE' IS NOT SET WITH COMMAND EXECUTION STATUS; RETURNED DATA IS IN ONE OR MORE VARIABLES | |
| 108  CONTINUE PROCESSING | |
| ⋮ | |

Fig. 5

```
 1    . . .
 2
 3    /* sample REXX client exec  */
 4    address SERVER2
 5    'REQUEST1'
 6
 7    . . .
 8
 9
10
11
12
13    /* sample server exec  */
14    DO FOREVER
15        'WAITREQ'      /* wait for request from client  */
16        Select
17            When request = 'END' then LEAVE  /* end the server  */
18            When request = 'REQUEST1' then call Process_request1
19            Otherwise rc = -3  /* command not found  */
20        end /* select  */
21    END /* DO FOREVER  */
22    exit
23
24
25    Process_request1:
26        vara = 100     /* set value to be passed to client  */
27        'S2C VARA'     /* copy server variable to client variable  */
28        rc = 0         /* send 'successful' return code to client  */
29        return
30
31
32
33
```

*Fig. 6*

METHOD AND SYSTEM FOR PROVIDING A CLIENT/SERVER INTERFACE IN A PROGRAMMING LANGUAGE

BACKGROUND OF THE INVENTION

1. Technical Field

The present invention relates in general to an improved data processing system and in particular to a method and system for providing a client/server interface to a programming language. Still more particularly, the present invention relates to a method and system for providing client/server support which permits a server to wait for client requests and to read and set client variables.

2. Description of the Related Art

In the art of data processing system programming, "client/server" interaction is becoming an increasingly popular form of software architecture. As utilized herein, "client/server" interaction is a relationship between two software processes, which may be running on the same data processing system or on different data processing systems which are coupled via a network system. The "server" process is a provider of services. The "client" process is a consumer of services. Client/server interaction provides a clean separation of function between processes based on the idea of service. Some of the reasons for this increase in popularity are discussed below.

A server may service many clients at the same time and regulate their access to shared resources. Clients typically initiate the dialog between clients and servers by requesting a service. Servers typically wait passively for a request from a client.

The server may reside on the same machine as the client or on a different machine across a network. Within client/server software, the location of the server is usually masked or hidden from the client by redirecting the service calls when required. A program may be a client, a server, or both.

The ideal client/server software is independent of hardware or operating system software platforms. Users should be able to mix and match client and server platforms.

Clients and servers are loosely coupled systems which may interact through a message-passing mechanism. The message is the delivery mechanism for service requests and replies.

The server is a "specialist." A message tells a server what service is requested and it is then up to the server to determine how the service is accomplished. Servers may be upgraded without affecting the clients as long as the published message interface is not changed.

The server code and server data are typically centrally maintained, which results in cheaper maintenance and the guarding of shared data integrity. At the same time, clients remain personal and independent.

The client/server characteristics described above allow intelligence to be easily distributed across a network, and provide a framework for the design of loosely coupled network based applications.

Many data processing system manufacturers provide a programming language called a "procedures language" for use with their hardware platforms. For example, International Business Machines Corporation (IBM) of Armonk, N.Y. provides the REXX language as a system procedures language to be used with data processing systems that follow IBM's System Application Architecture (SAA). In addition to performing the procedures language role, REXX is often used as a macro language, a simple application development language, as a prototyping language, and in personal computing. A procedures language may also be known as a glue language, a system extension language, an EXEC language, and a shell language.

Code written in a procedures language is often utilized to control the running environment, by providing an outer structure for what needs to be done or controlled. The role of a procedures language may be characterized by the fact that residual text is sent to a specified environment, such as the operating system's command line interface, for further interpretation. This includes system-specific commands, as well as commands which may be utilized to invoke whole applications. The procedures language allows programmers to write code that may be utilized personalize their data processing system environments. Code written in procedures language may also allow access to other programs or data.

In the role of a macro language, the procedures language interfaces with the command line interface presented by an application to the application user. For example, the procedures language may interface with a text editor, such as XEDIT on VM or KEDIT on the PC. This allows the application user to utilize the procedures language to personalize the application by grouping together application commands in conjunction with procedures language logic and, if needed, system commands. Users may utilize a sequence of commands presented by the procedures language to the application to perform repetitive tasks, and extend the application user interface.

In the REXX procedures language, programs are constructed from the following basic components: (1) clauses or statements, (2) tokens, (3) expressions, (4) instructions, (5) assignments, and (6) separators. In a REXX program, each program line usually contains at least one clause or statement. REXX interprets one clause at a time. Each clause can be divided into tokens, which are typically separated by blanks. Every item delimited by blanks inside a clause is defined as a token. The special characters comma (","), semicolon (";") and colon (":") are also used as token delimiters.

An expression is composed of terms and operators. There are three varieties of terms: (1) strings, (2) symbols, and (3) function calls. Each operator acts on two terms (except for prefix operators, which act on the term following). There are four varieties of operators/operations: (1) string concatenation, (2) arithmetic operators, (3) comparative operators, and (4) logical (boolean) operators.

Instructions are identified by a REXX keyword or a group of REXX keywords specifying a particular task.

Assignments assign a variable a value. A variable is a symbol that may change value during the execution of a REXX program.

Separators are defined as special characters which indicate the ending or continuation of a clause. Normally each clause occupies one physical program line. However, multiple clauses on one line may be separated by a semicolon (";"). A clause spanning more than one line is continued with a comma (",") at the end of each line to be continued.

When a REXX program is interpreted, each clause is subjected to two processes: (1) translation and (2) execution. During translation, all comments are ignored and substitution occurs. If, during substitution, a token is identified as a variable, it is replaced by its value; variables not previously referenced are dynamically defined.

During execution, three types of clauses require action: (1) instructions which are recognized as REXX keywords are executed; (2) assignments are made; and (3) commands are executed. In such execution of system commands, strings that are not recognized as null clauses, labels, assignments, or instructions, are passed to the calling environment for execution.

REXX is usable as a command or macro language for applications which have internal commands. It is also an extremely effective programming language, because it can utilize separately compiled program packages as REXX subprograms. These capabilities are facilitated by the "REXX environment model."

In the REXX environment model, there are essentially no illegal commands or statement forms. There may, however, be expressions which are illegal syntactically. Such command and statement forms can be categorized into those which are meaningful to the REXX interpreter and those which are not. Commands or statement forms which REXX does not understand are passed to the underlying environment in which REXX is executing, using the command interface defined for the environment.

When a REXX program is invoked, the calling environment, such as CMS or XEDIT, is the default environment in which commands will be executed. For example, an EXEC file invoked from XEDIT is passed on to CMS by XEDIT, thus making CMS the calling environment. If an expression is evaluated, resulting in a character string which does not represent a legitimate REXX operation, such a character string is submitted to the "addressed" environment for execution.

After execution of the command represented by such a character string, control is returned to the REXX interpreter after setting a return code appropriate for the addressed environment. This return code is assigned to a special REXX variable, "Rc." Upon return of control to the interpreter, the value of should be evaluated to determine whether or not alternative action is required. For example, if a command is intended to invoke a program stored in another file, and that file is not found, a return code will be returned indicating that the file was not found. Typically, successful completion of a command results in RC set to zero.

At present, if a user wishes to implement client/server support in the REXX procedures language, the user may add new interface routines as function calls or as callable subroutines, both of which may require code written in a language other than REXX. On the client side, the calls should be able to identify the target server and to pass a request. On the server side, routines should be able to wait for requests from a client, and retrieve and set client variables. At present, some procedural languages, such as REXX, do not have instructions for providing a "wait-for-request" function. Nor are instructions for reading and setting variables in a client program from a server program available in some procedural languages.

When adding new instructions to a programming language, the naturalness, readability, and maintainability (for which REXX is known) should be maintained.

Therefore, the problem remaining in the prior art is to provide the user of a programming language a method and system for providing client/server support which permits a server to wait for client requests and to read and set client variables, in a manner consistent with the programming language's friendly "look and feel."

SUMMARY OF THE INVENTION

It is therefore one object of the present invention to provide an improved data processing system.

It is another object of the present invention to provide a method and system for providing a client/server interface to a programming language.

It is yet another object of the present invention to provide a method and system for providing client/server support which permits a server to wait for client requests and to read and set client variables.

It is yet another object of the present invention to provide the user of a programming language a method and system for providing client/server support that allows users to benefit from the programming language's friendly "look and feel."

The foregoing objects are achieved as is now described. In a data processing system, a programming language processor capable of executing program code is provided. A client program and a server program are also provided within said data processing system. The client program and the server program are comprised of program code capable of execution within said data processing system. Once the client and server programs are invoked, the client program sends a request for a service to the server program. In response to program code within the server program, a request is sent to the client program for a service that requires access to a variable within the client program. The client program then processes the request from the server program and sends the server program a response. Thereafter, the server program continues processing the request from the client program in response to gaining access to the variable in the client program. If the server program has not been initialized when the client program requests a service, the client program automatically initializes the server program.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts the interaction during program execution between a client program and a server program, which are both located within a single data processing system, in accordance with the method and system of the present invention; and FIG. 6 is a program code sample which illustrates the process of sending a request from a client to a server, and passing variables between a client and server in accordance with the method and system of the present invention.

DETAILED DESCRIPTION OF PREFERRED EMBODIMENT

Figure 1:
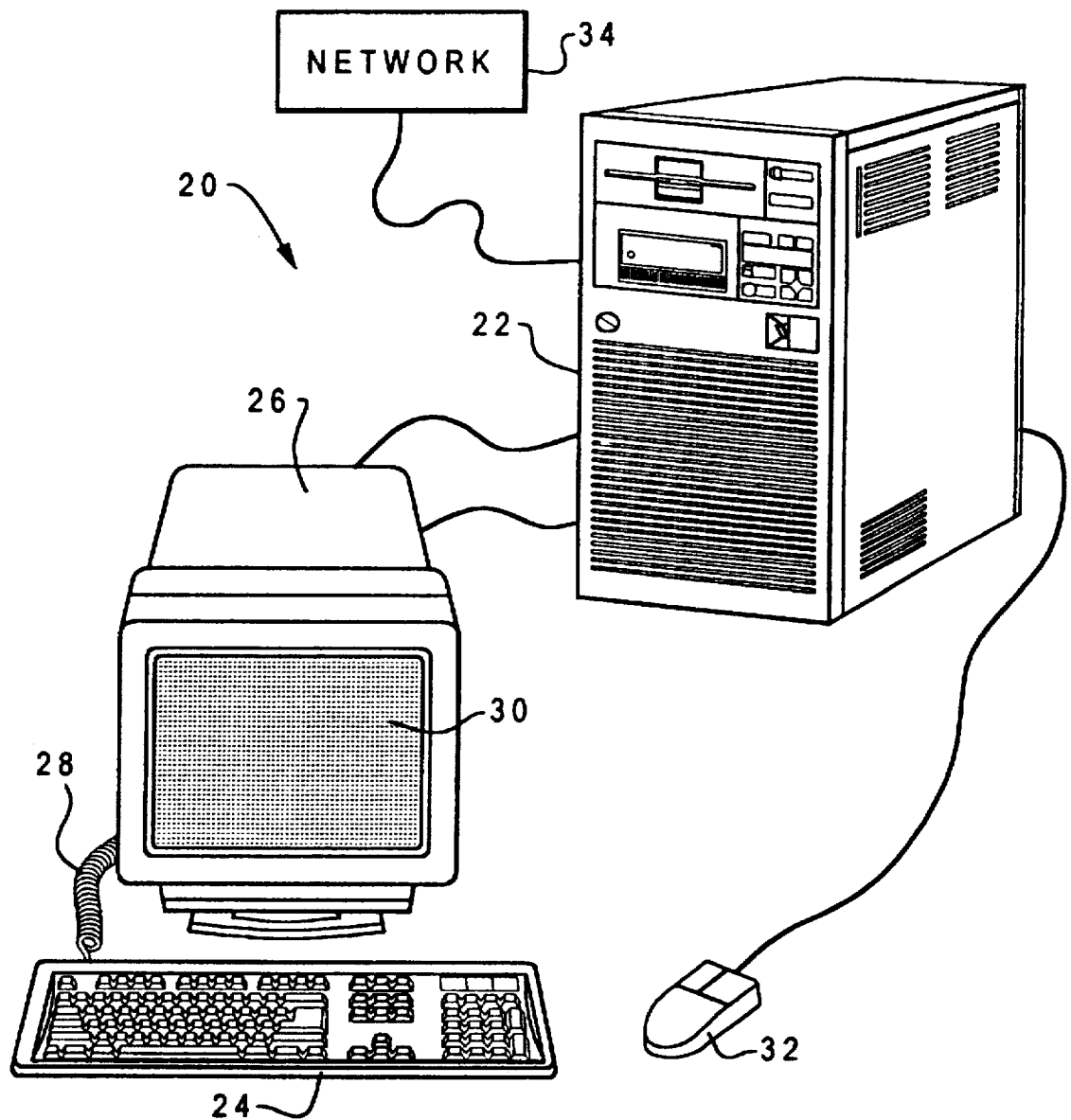
FIG. 1 depicts a data processing system which may be utilized to implement a preferred embodiment of the present invention.

With reference now to the figures and in particular with reference to FIG. 1, there is depicted a data processing system 20 which includes processor 22, keyboard 24, and display 26. Keyboard 24 is coupled to processor 22 via cable 28. Display 26 includes display screen 30, which may be implemented utilizing a cathode ray tube (CRT), a liquid crystal display (LCD), an electroluminescent panel, or the like. Data processing system 20 also includes pointing device 32 which may be implemented utilizing a trackball, joystick, touch sensitive tablet or screen, or as illustrated in FIG. 1, a mouse. Pointing device 32 may be utilized to move a pointer or cursor on display screen 30. Those persons skilled in the art of data processing system design will recognize that display 26, keyboard 24, and pointing device 32 may each be implemented utilizing any one of several known off-the-shelf components. Data processing system 20 may be implemented utilizing any so-called "personal computer," such as the personal computer sold under the trademark "PS/2" which is manufactured and distributed by International Business Machines Corporation (IBM), of Armonk, N.Y.

Figure 2:
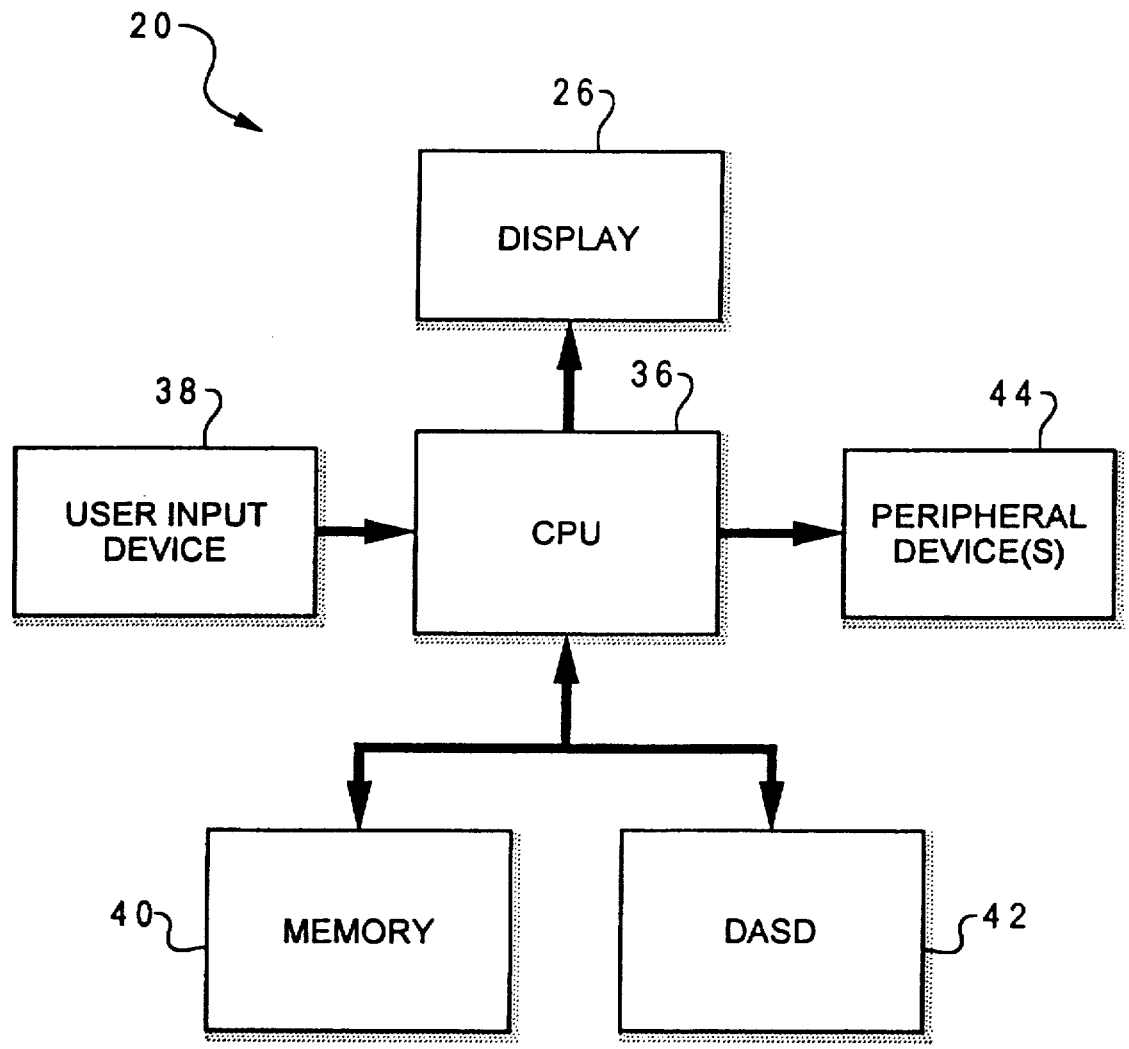
FIG. 2 is a more detailed high-level block diagram further illustrating the major components of the data processing system of FIG. 1.

With reference now to FIG. 2, there is depicted a more detailed high-level block diagram further illustrating the major components of data processing system 20 of FIG. 1. Data processing system 20 is controlled primarily by instructions, in the form of software, executed within central processing unit (CPU) 36. CPU 36 is coupled to display 26, which is utilized to display text and graphics, and possibly animated graphics or video. CPU 36 is also coupled to user input device 38, which is utilized to receive input from a data processing system user. User input device 38 may include keyboard 24 and pointing device 32, as illustrated in FIG. 1. Memory 40 and direct access storage device (DASD) 42 may be utilized for storing application programs (i.e., software) and data sets.

Peripheral devices 44 may also be included in data processing system 20. Such peripheral devices may include communications devices (i.e., modems or network adapters), or an audio output device for use during a multimedia presentation.

Figure 3:
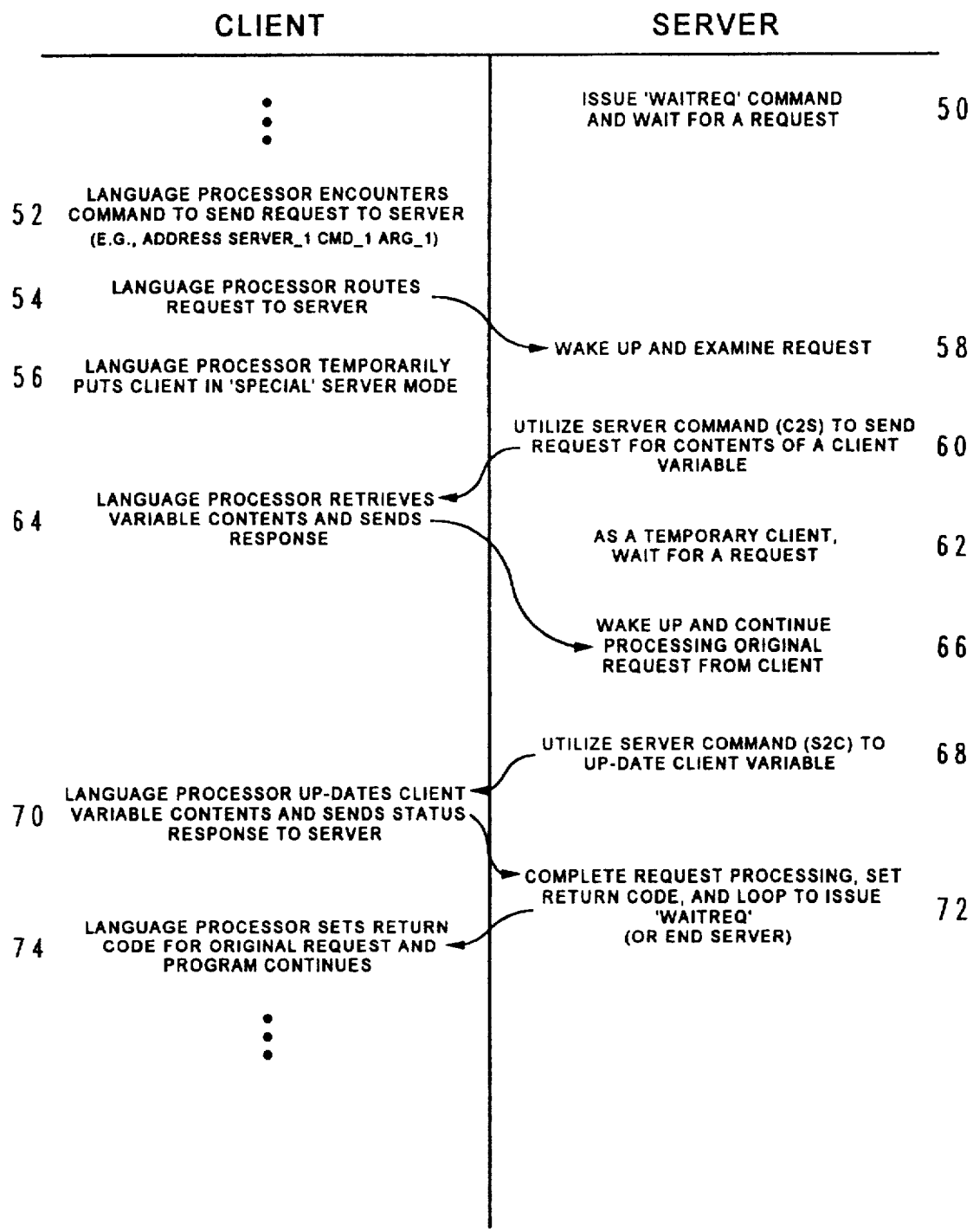
FIG. 3 depicts the interaction during program execution between a client program and an initialized server program, in accordance with the method and system of the present invention.

Referring now to FIG. 3, there is depicted the interaction during program execution between a client program and an initialized server program, in accordance with the method and system of the present invention. As illustrated by the ellipsis in the client column, the client program has been running before the steps illustrated in this figure occur, and the client program continues to run after the steps depicted have occurred.

The server program, which may be written in REXX program code, has been initialized and is running before a request is received from the client, as illustrated at reference numeral 50. To initiate a request by the client program, the programmer specifies in program code an environment, a command, and the appropriate command arguments. Such a program code instruction may take the form:

ADDRESS SERVER_1 CMD_1 ARG_1; where the environment is "SERVER_1," the command is "CMD_1," and the argument passed is "ARG_1."

During execution of the client program, the language processor encounters the above instruction and, after parsing the instruction tokens, sends a request string (i.e., CMD_1 ARe_1) to the server program, as depicted at reference numerals 52 and 54. The language processor may utilize tables to look up the location (i.e., the server-ID) of the server as specified by the environment selected by the "ADDRESS" instruction, the intended, and the specific command. Once the command processor determines that the target of a command is a server, standard client/server support routines are invoked. The server may be located within the same data processing system, or another data processing system coupled via any one of several known networking systems.

Before receiving the request, the server is "waiting." By utilizing a command, such as the "WAITREQ" command, the server may be instructed to wait for a request from a client, as illustrated at reference numeral 50. This "WAITREQ" command causes the server exec to be suspended until a request from a client arrives.

After the client sends the request, the client program temporarily enters a "server" mode, as illustrated at reference numeral 56. While in such a "server" mode, the client is suspended, except that the client may receive and process a request from the server.

After receiving the request, the server wakes up (i.e., discontinues the "WAITREQ" instruction) and examines the request, as depicted at reference numeral 58. To process the client request, program code in the server may need information contained in a variable in the client program. If this is the case, the server may request the contents of a client variable by utilizing the "C2S" command to make such a request to the client program, as illustrated at reference numeral 60. If the client variable requested is not an existing server variable, a new variable by the same name or, optionally, a new name is created in the server program.

After making a request for client variable contents, the server temporarily enters a "client" mode and waits for the response to the request, as depicted at reference numeral 62.

Upon receiving a request from the server for the contents of a client variable, the language processor that executes the client program retrieves the client variable contents and sends the contents, in the form of a response, to the server, as illustrated at reference numeral 64.

This response from the client to the server causes the server to wake up and continue processing the original request from the client with the benefit of having the contents of a selected client variable, as depicted at reference numeral 66.

If the server calculates a new value for the contents of the requested client variable, the server may up-date the client variable by utilizing the "S2C" command, as illustrated at reference numeral 68. In response to executing the "S2C" command, the language processor sends a request to the client. When such a request is received by the client, the language processor executing the client program writes, or up-dates, the contents of the client variable, and then sends a status response to the server, as depicted at reference numeral 70.

Upon receiving the status response from the client, the server completes the processing of the original request, sets an appropriate return code, and loops or jumps to the "WAITREQ" command in the server code to wait for the next request for service, as illustrated at reference numeral 7;. Such a return code is utilized to indicate the status of the execution of the service by the server.

As an alternative to looping to issue another "WAITREQ" command, the server may "end." If the server "ends," execution of server program code is discontinued. After a server "ends," the server must be reinitiated before the server is able to provide a service in response to a new request.

When the server is finished processing the client request, the language processor executing the client program communicates the server's return code to the client program, and client program continues, as depicted at reference numeral 74.

Figure 4:
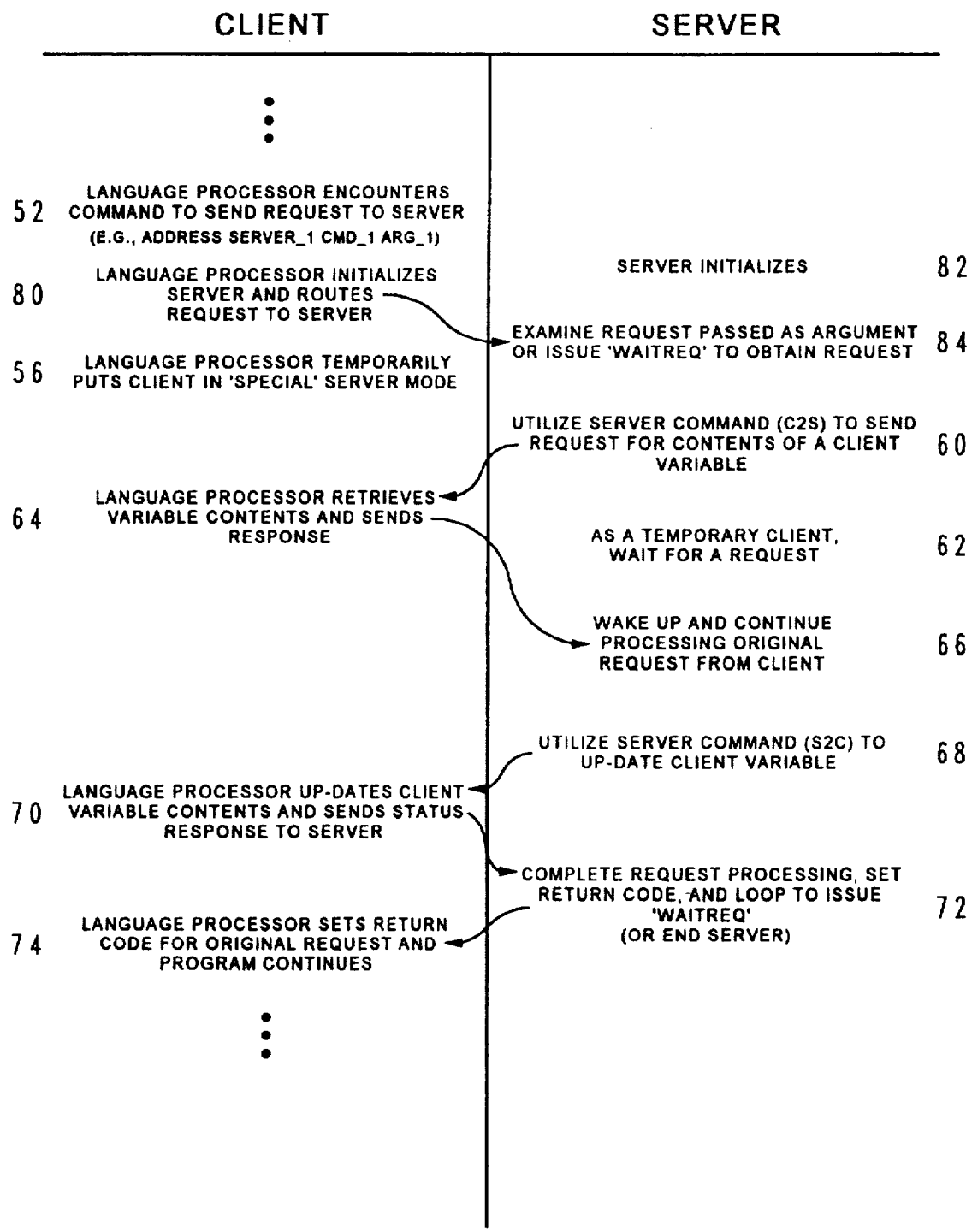
FIG. 4 illustrates the interaction during program execution between a client program and an uninitialized server program, in accordance with the method and system of the present invention.

With reference now to FIG. 4, there is depicted a chart which illustrates the interaction during program execution between a client program and an uninitialized server program, in accordance with the method and system of the present invention. Many steps in FIG. 4 are the same as corresponding steps in FIG. 3, and therefore, such steps have been identified with the same reference numerals.

FIG. 4 differs from FIG. 3 in that the server program is automatically initialized or initiated or invoked by the language processor running the client program when the client program sends a request to the server, as illustrated at reference numerals 80 and 82. After the server initializes, the server may examine the request and arguments passed from the client, or the server may begin waiting if such a request and arguments are not present, as depicted at reference numeral 84.

Thereafter the processing and interaction between client and server proceeds as described in reference to FIG. 3.

With reference now to FIG. 5, there is depicted a chart which illustrates the interaction during program execution between a client program and a server program which are both located within the same data processing system, in accordance with the method and system of the present invention. As illustrated, the server may be initiated before a request for service is received, as illustrated at reference numeral 50, or the language processor will initiate the server program when needed, as depicted at reference numeral 90.

Whether the server has been initiated or not, after the language processor has encountered a command targeted to a server (see reference numeral 52), the language processor puts the request for service in the server "request" variable, as illustrated at reference numeral 92. Thereafter, the client waits for a response, as depicted at reference numeral 94. In this case, the client is not temporarily put into a "special" server mode as described above with reference to FIGS. 3 and 4 above, because, in this implementation, the server may access the client's variables directly.

When the clients sets the server "request" variable, the server wakes up and examines the "request" variable, as illustrated at reference numeral 96. If the server needs the contents of a client variable, the server may utilize the "C2S" command to retrieve the contents of a client variable into a server variable, as depicted at reference numeral 98. Such a retrieval of the contents of a client variable is accomplished utilizing a variable interface routine which permits access to client and server variables directly. In the REXX language, for example, such a variable interface routine is called "EXECCOMM".

In a similar manner, the server program may utilize the "S2C" command to copy contents of named server variables to named client variables, as illustrated at reference numeral 100. When either the "S2C" or "C2S" command is utilized, the variables in the requesting client are automatically addressed.

After the server has retrieved and set the necessary client variables, the server completes processing the request, sets the return code, and loops to the "WAZTREQ" command near the beginning of the server program, as depicted at reference numeral 102. As an alternative to looping to the "WAITREQ" command, the server may end, as discussed above.

As the server returns to the "WAITREQ" command, or as the server ends, the language processor sets the client return code and wakes up the client, as illustrated at reference numeral 104. The client server then receives returned data in one or more variables, as depicted at reference numeral 106. At this step, the return code is not set to indicate command execution status.

Thereafter, the client continues processing, as illustrated at reference numeral 108.

Finally, with reference to FIG. 6, there is depicted a program code sample which illustrates the process of sending a request from a client to a server, and the process of passing variables between a client and server, in accordance with the method and system of the present invention. Lines one through seven illustrates code that may be utilized in a client program to send a request to a server program. Lines 13 through 29 illustrates code that may be utilized in a server program.

As illustrated in line four, the program code sets the environment wherein the desired server is located. In line five, the command "request1" is sent to the environment "server2."

The server exec code is depicted at lines 13 through 29. In line 15, utilization of the "WAITREQ" instruction is illustrated. Server execution is suspended at line 15 until a "request" is received. When a request is received, the program is directed by instructions in lines 17 through 19.

For example, if the request variable equals "END," the process ends the server, at line 22. If the request variable equals "END," the process calls the subroutine "Process_request1" located at line 25. If the request variable is equal to some other string, the server returns a return code (e.g., rc=−3) which indicates the command was not found in the server.

In the subroutine "Process_request1" located at line 25, the program first sets the value of variable "VARA" equal to "100". In line 27, the program utilizes the "S2C" command to copy the server variable "VARA" to the client variable "VARA". If the client variable "VARA" is not an existing client variable, a new variable by the same name or, optionally, a new name is created in the client program. Thereafter, in line 28, the return code "rc" is set to "0" to indicate the command was successfully completed. In line 29, the program returns to the "do forever" leep at line 14 and waits for another service request at the "WAITREQ" command in line 15.

In the description of the present invention, examples of synchronous client requests have been illustrated. A request by a client is synchronous when the client suspends further processing until the server responds to the request. Although the embodiments of the present invention have been described with reference to synchronous client requests, programming languages may also include support for asynchronous client requests by providing queuing and the ability to test for a response or wait for a response. Such testing or waiting for a response may be implemented by utilizing a correlation ID passed along with the original request.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for providing client/server interaction capability in a programming language processor for executing program code, said method comprising the steps of:

providing a programming language processor within said data processing system;

providing a client program within said data processing system wherein said client program is comprised of program code for executing within said data processing system;

providing a server program within said data processing system wherein said server program is comprised of program code for executing within said data processing system;

invoking said client program;

invoking said server program;

from said client program, sending a request for a service to said server program;

within said server program, sending a request to said client program for a service that requires access to a variable within said client program, wherein said request to said client program by said server program is sent in response to program code within said server program;

within said client program, processing said request from said server program; and within said server program, processing said request from said client program in response to said access to said variable in said client program.

2. The method in a data processing system for providing client/server interaction capability in a programming language processor according to claim 1 wherein said step of sending a request to said client program for a service that requires access to a variable within said client program includes sending a request to said client program for a service that requires reading a variable within said client program.

3. The method in a data processing system for providing client/server interaction capability in a programming language processor according to claim 1 wherein said step of sending a request to said client program for a service that requires access to a variable within said client program includes sending a request to said client program for a service that requires modifying a variable within said client program.

4. The method in a data processing system for providing client/server interaction capability in a programming language processor according to claim 1 wherein said step of invoking said server program includes automatically invoking said server program utilizing said programming language processor.

5. A data processing system for providing client/server interaction capability in a programming language processor for executing program code comprising:

a programming language processor within said data processing system;

a client program within said data processing system wherein said client program is comprised of program code for executing within said data processing system;

a server program within said data processing system wherein said server program is comprised of program code for executing within said data processing system;

means for invoking said client program;

means for invoking said server program;

means for sending a request for a service from said client program to said server program;

means for sending a request in response to program code within said server program to said client program from said server program for a service that requires access to a variable within said client program;

means in said client program for processing said request from said server program; and means in said server program for processing said request from said client program responsive to said access to said variable in said client program.

6. The data processing system for providing client/server interaction capability in a programming language processor according to claim 5 wherein said means for sending a request in response to program code within said server program to said client program from said server program for a service that requires access to a variable within said client program includes means for sending a request to said client program for a service that requires reading a variable within said client program.

7. The data processing system for providing client/server interaction capability in a programming language processor according to claim 5 wherein said means for sending a request in response to program code within said server program to said client program from said server program for a service that requires access to a variable within said client program includes means for sending a request to said client program for a service that requires modifying a variable within said client program.

8. The data processing system for providing client/server interaction capability in a programming language processor according to claim 5 wherein said means for invoking said server program includes means for automatically invoking said server program utilizing said programming language processor.

* * * * *

UNITED STATES PATENT AND TRADEMARK OFFICE
CERTIFICATE OF CORRECTION

PATENT NO. : 5,546,583
DATED : August 13, 1996
INVENTOR(S) : Shriver

It is certified that error appears in the above-indentified patent and that said Letters Patent is hereby corrected as shown below:

Column 6, line 2: replace "ARe_1)" with --ARG_1--

Column 6, line 63: replace "7;" with --72--

Column 7, line 65: replace "WAZTREQ" with --WAITREQ--

Column 8, line 48: replace "Iccp" with --loop--

Signed and Sealed this

Nineteenth Day of November, 1996

Attest:

BRUCE LEHMAN

Attesting Officer

Commissioner of Patents and Trademarks